United States Patent Office 2,782,835
Patented Feb. 26, 1957

2,782,835

INVALID WHEEL CHAIR HAVING REVERSIBLE DRIVE AND CASTER WHEELS

John C. Liebich, Toledo, Ohio, assignor to Gendron Wheel Company, Perrysburg, Ohio, a corporation of Ohio Application March 19, 1954, Serial No. 417,289

1 Claim. (Cl. 155—30)

This invention relates to invalid wheel chairs employing a pair of large drive wheels arranged at one end of the chair, and a pair of caster wheels at the opposite end, and an object is to enable the positions of the drive and caster wheels to be conveniently reversed, thereby selectively to position the drive wheels at the front and the caster wheels at the rear, or vice versa, and to achieve such mounting in a new and improved manner which not only increases the stability of the chair, but lengthens the wheel base for enhancing the comfort of the occupant.

Other objects and advantages of the invention will hereinafter appear, and for purposes of illustration but not of limitation, an embodiment of the invention is shown on the accompanying drawings, in which Figure 1 is a side elevation of an invalid wheel chair with the drive wheels mounted at the front and caster wheels at the rear;

Figure 1:
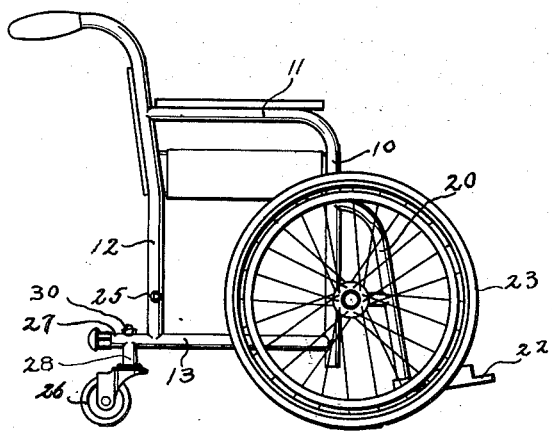
Figure 2:
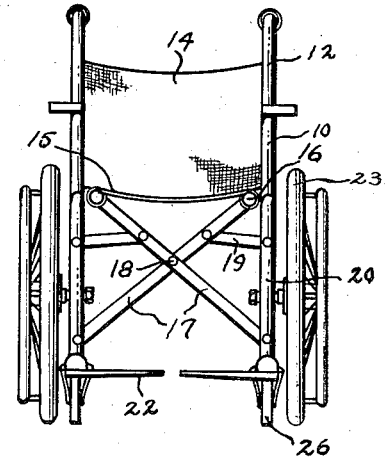
Figure 2 is a front elevation of the wheel chair shown in Figure 1.
Figures 3, 4:
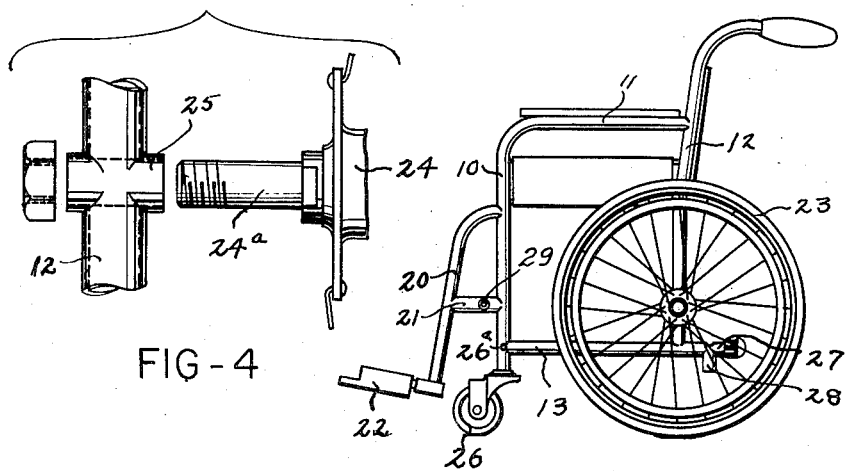
Figure 3 is a side elevation of the wheel chair showing the drive wheels mounted at the rear and the caster wheels at the front.
Figure 4 is an exploded fragmentary view showing the manner in which the wheel axles are mounted on the chair.

The illustrated embodiment of the invention comprises an invalid chair composed of a pair of identical side frames. Each side frame has a vertically disposed front leg 10, which is of tubular construction, with the lower end thereof being open, and integral with the upper end of the leg 10 is a rearwardly extending horizontally disposed arm rest member 11. The rear end of the arm rest tube 11 is fixed to a vertically disposed rear leg 12 which extends upwardly and inclines rearwardly to receive handle grips as shown. The bottom end of the rear leg of each side frame is fixed to a horizontal tubular brace rod 13, the front end of which is fixed to the lower end of the vertical front leg 10 slightly above the bottom end thereof.

The upper ends of the rear legs 12 are connected by a piece of canvas 14 constituting the back rest. Another piece of canvas 15 constitutes the seat for the chair, and opposite sides of the seat 15 are secured to horizontal rails 16. The front and rear ends of the rails 16 have cross braces 17 secured thereto, these inclining downwardly and laterally to pivot against the front or rear leg structures as the case may be. The cross braces are pivoted at 18 intermediate their ends, and links 19 connect the upper portions of the cross braces to the adjacent legs, as shown.

At a point slightly beneath the seat 15 and rigid with each of the front legs 10 is a foot rest arm 20, and as shown, the arm curves outwardly and downwardly from the adjacent front leg and then inclines downwardly and forwardly substantially as shown, the lower end being disposed below the bottom end of the adjacent leg. The foot rest arm 20 is braced by a horizontally disposed tube which is rigidly connected respectively to the adjacent foot rest arm and leg 10. The brace 21 is parallel to the cross rod 13 and is disposed a short distance above such cross rod. At the lower end of each of the foot rest arms 20 is a pivotally mounted foot pad 22 which can be swung to position of use to provide a foot rest, or can be swung upwardly to position out of use when the chair is folded or compacted.

A pair of relatively large drive wheels 23 are provided with axles 24 having laterally projecting threaded extensions 24a. Such extensions may be inserted through laterally disposed bearings 25 in the rear legs 12, and by applying a nut to the threaded extension, the axle may be readily secured in place. When the drive wheels 23 are in such position, caster wheels 26 are inserted into the lower ends of the front legs 10, screws 26a being provided for securing the caster stems in position.

The drive wheels 23 may be mounted on the horizontal braces 21 and it will be observed that in each of these braces is a bearing 29 through which the threaded axle extensions may extend so that the axles of the drive wheels may be secured at the front of the chair when this is desired. It will be observed that the bearings 29 which are integrally formed in the tubular brace members enable the axles to be disposed forwardly of the front legs 10. When the drive wheels 23 are mounted on the bearings 29, the caster wheels 26 are mounted in depending bearing tubes 28 integral with and depending from rearwardly disposed extensions of the lower braces 13. Bumpers B are fitted on the rear ends of lower braces 13. Thus the bearing tubes 29 are disposed substantially rearwardly of the rear legs 12. The tubular extensions 27 are apertured to align with the depending tubes 29 so that when the stems of the caster wheels 26 are inserted therein, a threaded portion of the stem may extend sufficiently thereabove to receive nuts 30 for securing the caster wheels in place.

From the above, it will be understood that the bearings 25 in the rear legs 12, and the bearings 29 in the horizontal braces 21 align respectively with each other in a horizontal plane, so that the drive wheels 23 are in each position disposed at the same level. Similarly, the caster wheels in either the front or rear positions are in the same relative horizontal plane, as will be manifest.

When the chair moves forwardly, caster wheels 26 swivel to their full line positions of Fig. 1 so that they are beneath bumpers B and provide optimum normal wheel base length for the chair. However, when the chair moves rearwardly, caster wheels 26 swivel to their dotted line positions so that bumpers B become effective to prevent marring of furniture, and to transmit the impact of collision to the frame via the strong box-like structure provided by lower braces 13 and the connection with the adjacent frame parts.

From the above description, it will be manifest that I have produced an exceedingly simple and inexpensive mounting for the drive wheels and casters of an invalid wheel chair. One advantage in mounting the drive wheels on the braces 21 forwardly of the front legs and at the same time mounting the caster wheels 26 rearwardly of the rear legs 12, affords a longer wheel base, contributes to the comfort of the occupant, and militates against tipping of the chair. It will be further apparent that in either position of the drive wheels and casters, the seat is mounted in the same horizontal position.

It is to be understood that numerous changes in details of construction, arrangement and operation may be effected without departing from the spirit of the invention especially as defined in the appended claim.

What I claim is:

An invalid wheel chair comprising a pair of laterally spaced side frames; brace members holding these side frames in spaced relation, each side frame comprising: a single bar substantially of inverted L-shape having stem and foot portions oriented with the stem portion extending substantially vertically and the foot portion extending rearwardly from the upper end thereof so as respectively to constitute a front leg and a combined arm rest and top frame member; a single bar of substantially inverted J-shape having stem and curved portions oriented with the stem portion extending generally vertically and the curved portion extending rearwardly therefrom and respectively constituting a combined rear leg and back rest support, and a handle; the rear end of the foot portion of the L-shaped bar being rigidly affixed to the stem portion of the J-shaped bar at a point below the curved portion thereof, and the lower end of the stem portion of the L-shaped bar terminating below the lower end of the stem portion of the J-shaped bar; a single straight bar horizontally disposed in the fore-and-aft direction of the frame and having a forward end rigidly affixed to the stem portion of the L-shaped bar at a point above the lower end thereof, the lower end of the J-shaped bar being rigidly affixed to the straight bar at a point forwardly of its rear end, whereby said straight bar constitutes a bottom frame member with the rear portion thereof extending rearwardly from the juncture with the stem of the J-shaped bar, said rear portion having an aperture extending vertically therethrough intermediate the rear end of said straight bar and the juncture thereof with the lower end of said J-shaped bar; a bumper on the rear end of said straight bar; a stud tube rigidly depending from the rear portion of said straight bar with the interior of the stub tube in registry with the aperture and, together with said aperture constituting a first caster bearing; a second single bar of substantially inverted J-shape having stem and curved portions oriented with the curved portion extending rearwardly and the stem portion extending downwardly nad forwardly therefrom, the rear end of the curved portion being secured to the stem portion of the L-shaped bar at a point below its juncture with the foot portion and constituting a leg rest support; a single straight stub bar horizontally disposed in the fore-and-aft direction of the frame and having forward and rear ends rigidly affixed to the stem portions of the J-shaped bar constituting the leg rest support and the front leg of the frame; a first wheel bearing support in the stub bar; a second wheel-bearing support in the stem of the J-shaped bar substantially in the horizontal plane of the first wheel bearing support; the lower end of the stem portion of the L-shaped bar being hollow and constituting a second caster bearing; said invalid wheel chair further including a pair of relatively large wheels disposed on opposite sides of the frame and journalling selectively in said large wheel bearings, and a pair of relatively small wheels disposed on opposite sides of the frames, and caster supports for said small wheels swivelling respectively about vertical axes in said caster bearings, said caster supports functioning to offset said small wheels from the swivel axes thereof whereby, upon forward movement of said wheel chair, said small wheels lie beneath said bumpers and, upon rearward movement of the wheel chair, said caster wheels lie forwardly of said bumpers.

References Cited in the file of this patent

UNITED STATES PATENTS

| | | |
|---|---|---|
| 2,561,616 | Everest et al. | July 24, 1951 |
| 2,675,057 | Glass | Apr. 13, 1954 |